United States Patent
Shen

(10) Patent No.: US 9,887,602 B2
(45) Date of Patent: Feb. 6, 2018

(54) FAN BEARING CUP CONNECTION STRUCTURE

(71) Applicant: ASIA VITAL COMPONENTS CO., LTD., New Taipei (TW)

(72) Inventor: Meng Shen, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 172 days.

(21) Appl. No.: 14/724,788

(22) Filed: May 28, 2015

(65) Prior Publication Data

US 2016/0352180 A1     Dec. 1, 2016

(51) Int. Cl.
*H02K 5/00* (2006.01)
*H02K 5/167* (2006.01)

(52) U.S. Cl.
CPC ......... *H02K 5/1675* (2013.01); *H02K 5/1672* (2013.01)

(58) Field of Classification Search
CPC ............................... H02K 5/1672; H02K 7/14
USPC ................................. 310/67 R, 90
See application file for complete search history.

(56) References Cited

U.S. PATENT DOCUMENTS

| 6,847,141 | B2* | 1/2005 | Wang | F04D 29/057 |
| | | | | 310/67 R |
| 6,882,074 | B2* | 4/2005 | Horng | F04D 29/057 |
| | | | | 310/90 |
| 7,649,291 | B2* | 1/2010 | Horng | H02K 5/1675 |
| | | | | 310/90 |
| 9,062,567 | B2* | 6/2015 | Kaji | F01D 25/162 |
| 2004/0189113 | A1* | 9/2004 | Kuribara | F04D 29/051 |
| | | | | 310/67 R |

FOREIGN PATENT DOCUMENTS

| TW | 200801339 A | 1/2008 |
| TW | M434135 U1 | 7/2012 |
| TW | 201312903 A1 | 3/2013 |

* cited by examiner

*Primary Examiner* — Hanh Nguyen
*Assistant Examiner* — Leda Pham
(74) *Attorney, Agent, or Firm* — C. G. Mersereau; Nikolai & Mersereau, P.A.

(57) ABSTRACT

A fan bearing cup connection structure includes a bearing cup, a bottom board and a connection member. The bearing cup has a receiving space, a connected section and a shaft hole. The shaft hole is formed at a top end of the bearing cup in communication with the receiving space. The connected section is disposed on outer circumference of the other end of the bearing cup opposite to the shaft hole. The bottom board has an opening. The connected section of the bearing cup is disposed in the opening. The connection member is connected between the bearing cup and the bottom board by means of injection molding. By means of the connection member, the bearing cup and the bottom board can be more securely connected with each other to greatly enhance the concentricity of the bearing cup and the bottom board.

4 Claims, 6 Drawing Sheets

FAN BEARING CUP CONNECTION STRUCTURE

BACKGROUND OF THE INVENTION

1. Field of the Invention

The present invention relates generally to a fan bearing cup connection structure, which can enhance the connection precision between the fan bearing cup and the fan frame body and enhance the concentricity of the bearing cup and the bottom board.

2. Description of the Related Art

A conventional cooling fan is mainly used to forcedly guide airflow to dissipate the heat of a heat source. In the cooling fan, an inductive magnetization takes place between the rotor and the stator to make the rotor rotate for guiding the airflow.

In the cooling fan, the rotor has a shaft and a fan impeller assembled with the shaft. The fan impeller has a hub and multiple blades. The stator is disposed around the bearing cup of the fan frame body corresponding to the hub of the fan impeller. In general, the bearing cup of the fan is a structure body formed by injection molding and integrally connected with the fan frame body. Alternatively, the bearing cup of the cooling fan can be made of copper material. The copper-made bearing cup is connected on the base seat of the fan frame body by means of riveting. However, in the riveting process, the structure of the fan is easy to damage. Moreover, the bearing cup is apt to loosen from the base seat due to incomplete riveting to make noise. In addition, in the riveting process, a pressure is applied to the copper-made bearing cup to force the copper-made bearing cup into the base seat of the fan frame body by press fit. It is hard to control the concentricity of the copper-made bearing cup and the base seat of the fan frame body.

Furthermore, the conventional metal-made bearing cup is assembled and connected with the metal-made fan frame body. Both the bearing cup and the fan frame body are made of metal material. As a result, when the fan operates and vibrates, the metal-made bearing cup often co-vibrates with the metal-made fan frame body to make noise.

It is therefore tried by the applicant to provide a fan bearing cup connection structure to solve the above problems existing in the conventional cooling fan.

SUMMARY OF THE INVENTION

It is therefore a primary object of the present invention to provide a fan bearing cup connection structure, which can enhance the assembling tightness and connection precision between the fan bearing cup and the fan frame body.

It is a further object of the present invention to provide the above fan bearing cup connection structure, which can enhance the concentricity of the fan bearing cup and other fan components.

To achieve the above and other objects, the fan bearing cup connection structure of the present invention includes a bearing cup, a bottom board and a connection member.

The bearing cup has a receiving space, a connected section and a shaft hole. The shaft hole is formed at a top end of the bearing cup in communication with the receiving space. The connected section is disposed on outer circumference of the other end of the bearing cup opposite to the shaft hole.

The bottom board has an opening. The connected section of the bearing cup is disposed in the opening of the bottom board.

The connection member is disposed between the opening of the bottom board and the connected section of the bearing cup by means of injection molding to connect the bottom board and the bearing cup.

The fan bearing cup connection structure of the present invention can greatly improve the concentricity of the bearing cup and other fan components and enhance the assembling tightness and connection precision between the fan bearing cup and the fan frame body. In addition, the connection member is formed between the bearing cup and the bottom board by means of double injection molding to securely connect the bearing cup and the bottom board with each other. The material of the connection member is freely selected from a group consisting of shock absorption material and elastic material such as rubber or plastic material. In this case, the bearing cup and the bottom board can be tightly connected with each other to reduce the co-vibration between the bearing cup and the bottom board and lower the noise made in operation of the fan.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
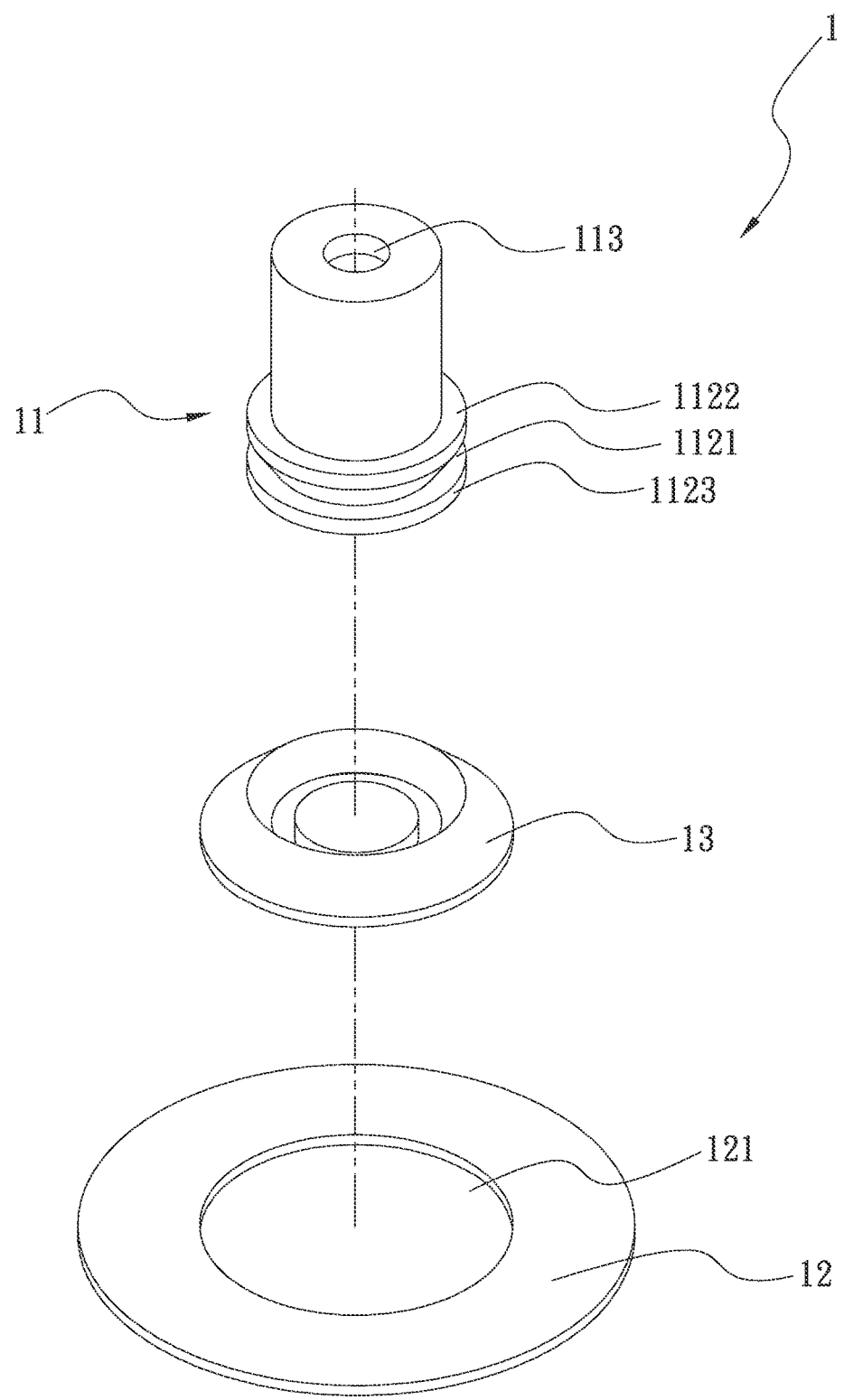
FIG. 1 is a perspective exploded view of a first embodiment of the fan bearing cup connection structure of the present invention.
Figure 2:
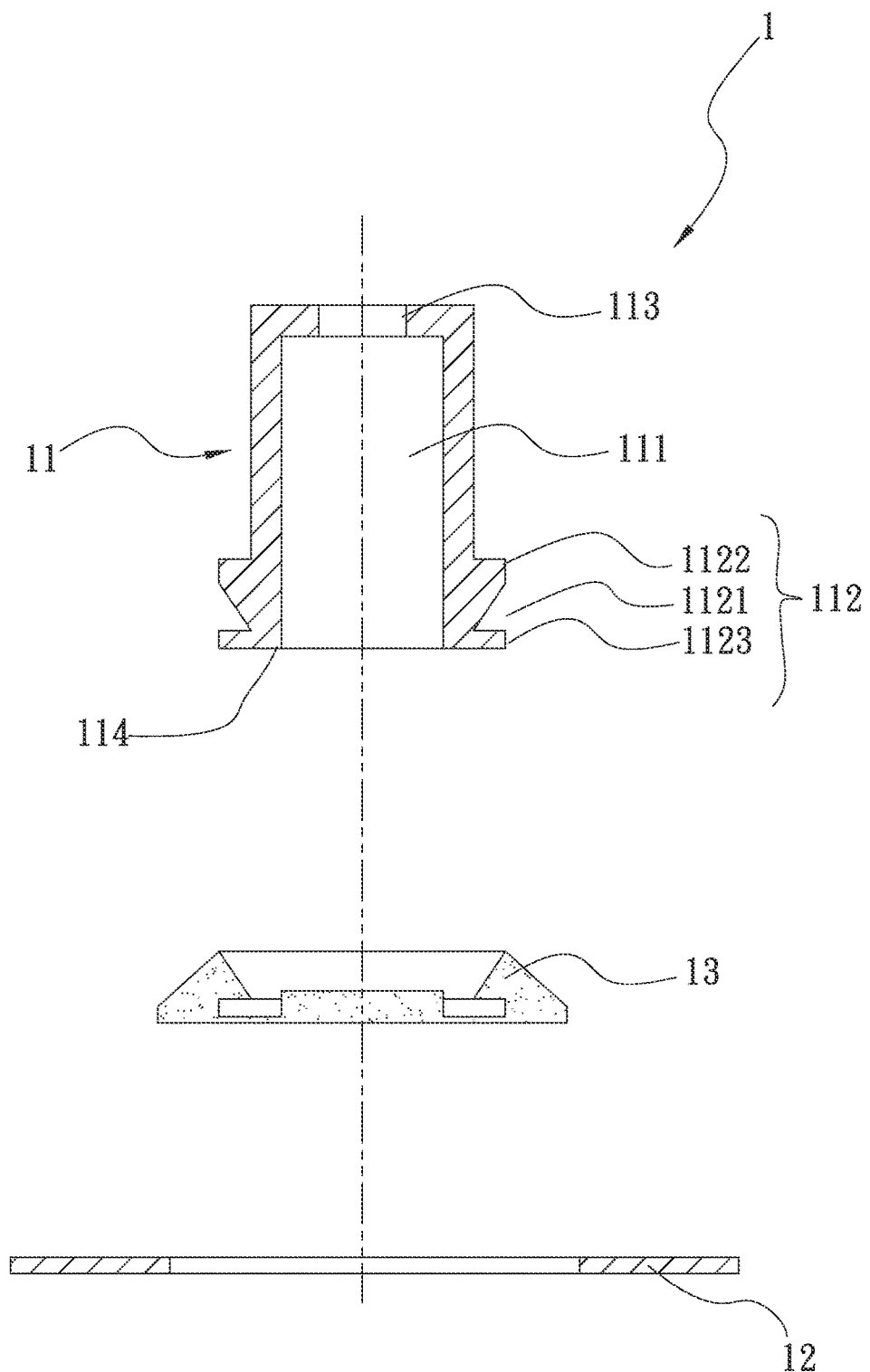
FIG. 2 is a sectional exploded view of the first embodiment of the fan bearing cup connection structure of the present invention.
Figure 3:
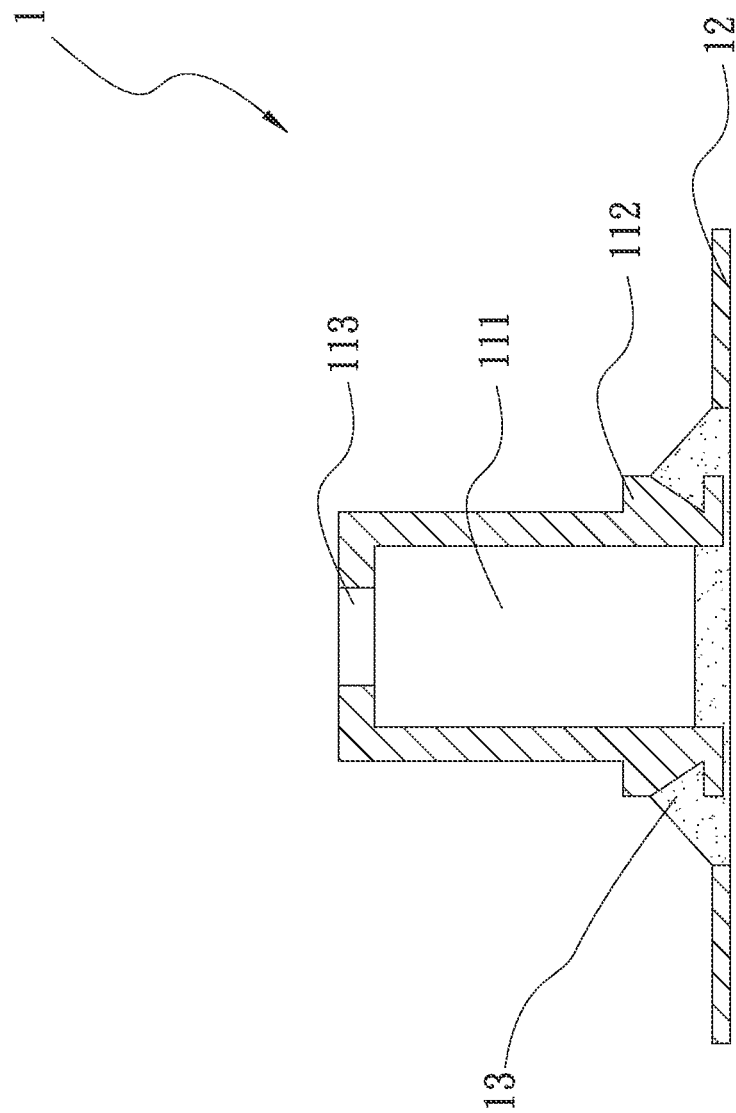
FIG. 3 is a sectional assembled view of the first embodiment of the fan bearing cup connection structure of the present invention.

Please refer to FIGS. 1, 2 and 3. FIG. 1 is a perspective exploded view of a first embodiment of the fan bearing cup connection structure of the present invention. FIG. 2 is a sectional exploded view of the first embodiment of the fan bearing cup connection structure of the present invention. FIG. 3 is a sectional assembled view of the first embodiment of the fan bearing cup connection structure of the present invention. According to the first embodiment, the fan bearing cup connection structure 1 includes a bearing cup 11, a bottom board 12 and a connection member 13.

The bearing cup 11 has a receiving space 111, a connected section 112 and a shaft hole 113. The shaft hole 113 is formed at a top end of the bearing cup 11 in communication with the receiving space 111. The connected section 112 is disposed on outer circumference of the other end of the bearing cup 11 opposite to the shaft hole 113. The connected section 112 has a groove 1121, a first annular body 1122 and a second annular body 1123. The first and second annular bodies 1122, 1123 are annularly disposed on outer circumference of the bearing cup 11 to together define the groove 1121.

The bottom board 12 has an opening 121. The connected section 112 of the bearing cup 11 is disposed in the opening 121 of the bottom board 12. The bottom board 12 can be made of polymer material or metal material.

The connection member 13 is disposed between the opening 121 of the bottom board 12 and the connected section 112 of the bearing cup 11 by means of injection molding to connect the bottom board 12 and the bearing cup 11. The other end of the bearing cup 11 is an open end 114 opposite to the shaft hole 113. The connection member 13 serves to block the open end 114.

The connection member 13 is a structure body made by injection molding. Mainly, the bearing cup 11 and the bottom board 12 are first placed into a mold (not shown). Then, a half-molten material (plastic or metal material) is filled between the bearing cup 11 and the bottom board 12 by means of injection molding. After the half-molten material filled in the mold is cooled and solidified (double injection), the material forms the connection member 13 to fixedly connect the bearing cup 11 and the bottom board 12 with each other.

Figure 4:
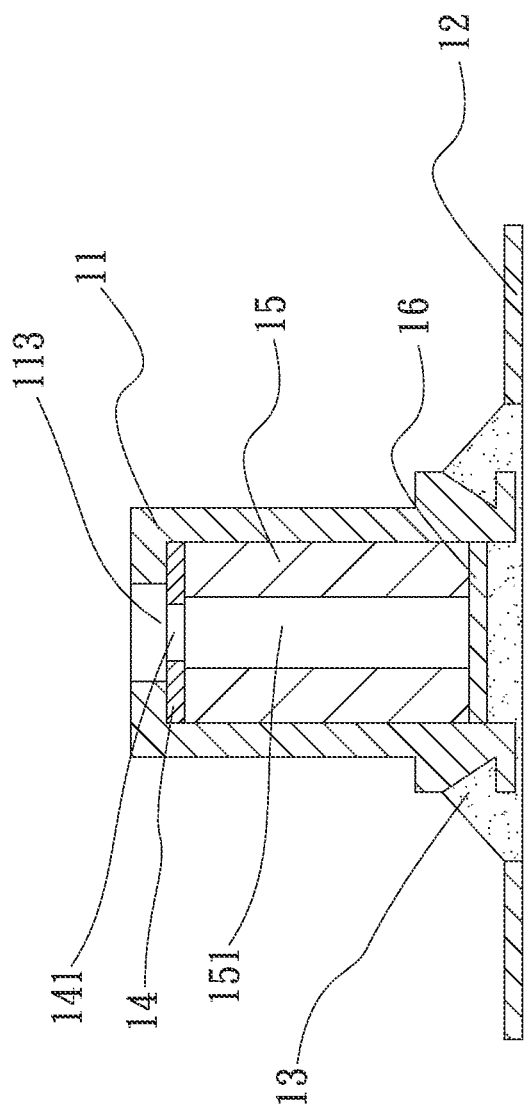
FIG. 4 is a sectional assembled view of a second embodiment of the fan bearing cup connection structure of the present invention.

Please now refer to FIG. 4, which is a sectional assembled view of a second embodiment of the fan bearing cup connection structure of the present invention. The second embodiment is partially identical to the first embodiment in technical characteristic and thus will not be repeatedly described hereinafter. The second embodiment is different from the first embodiment in that a retainer ring 14, a bearing 15 and a wear plate 16 are further disposed in the receiving space 111 of the bearing cup 11 and arranged in the receiving space 111 in sequence from upper side to lower side.

The retainer ring 14 has a perforation 141. The bearing 15 has an axial passage 151. The perforation 141 and the axial passage 151 communicate with the shaft hole 113.

In this embodiment, the retainer ring 14, the bearing 15 and the wear plate 16 are first together placed into the receiving space 111 of the bearing cup 11. Then, the bearing cup 11 with the retainer ring 14, the bearing 15 and the wear plate 16 and the bottom board 12 are together placed into a mold (not shown). Then, a half-molten material (plastic or metal material) is filled between the bearing cup 11 and the bottom board 12 by means of injection molding. After the half-molten material filled in the mold is cooled and solidified, the material forms the connection member 13 to fixedly connect the bearing cup 11 and the bottom board 12 with each other.

Figure 5:
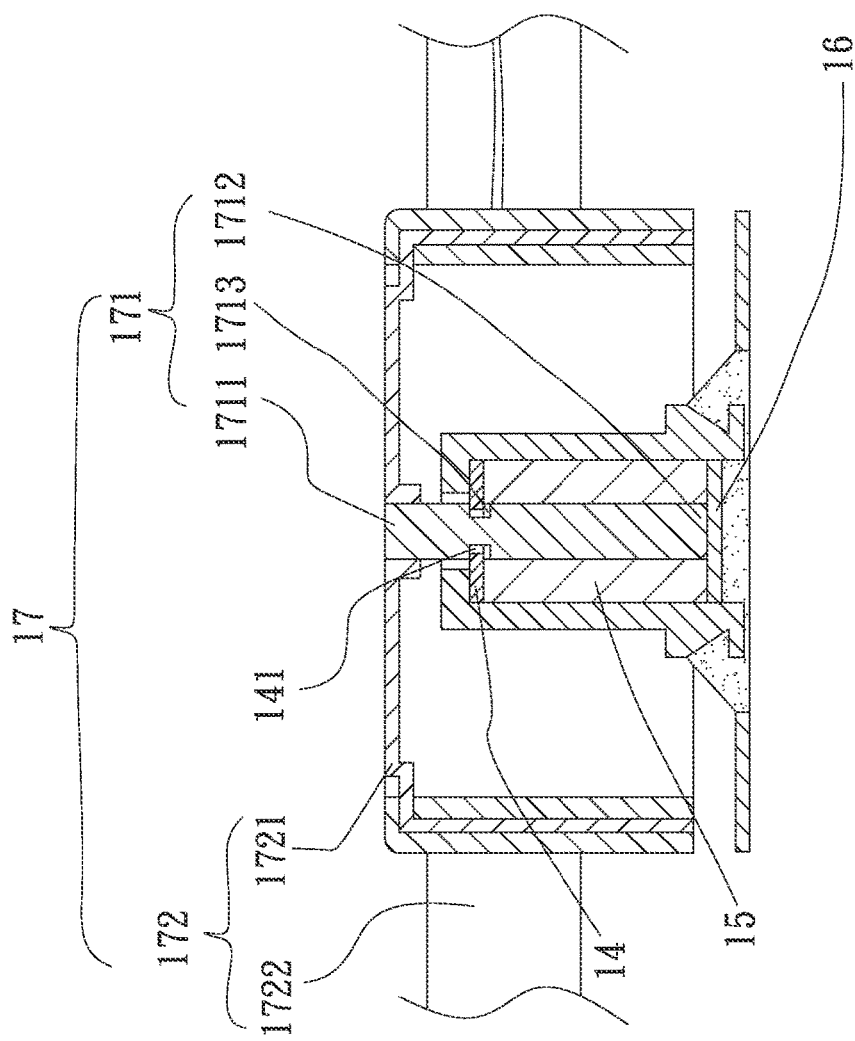
FIG. 5 is a sectional assembled view of a third embodiment of the fan bearing cup connection structure of the present invention.

Please now refer to FIG. 5, which is a sectional assembled view of a third embodiment of the fan bearing cup connection structure of the present invention. The third embodiment is partially identical to the second embodiment in technical characteristic and thus will not be repeatedly described hereinafter. The third embodiment is different from the second embodiment in that the third embodiment further has a rotor assembly 17. The rotor assembly 17 has a shaft 171 and a fan impeller 172. The shaft 171 has a first end 1711 and a second end 1712. The shaft 17 is formed with a groove 1713 in adjacency to the first end 1711. The fan impeller 172 is connected with the first end 1711 of the shaft 171. The second end 1712 of the shaft 171 passes through the perforation 141, the axial passage 151 and the shaft hole 113 and is rotatably connected with the bearing 15. The second end 1712 abuts against the wear plate 16. The fan impeller 172 has a hub 1721 and multiple blades 1722. The blades 1722 are annularly disposed on outer circumference of the hub 1721. The groove 1713 of the shaft 171 is positioned where the perforation 141 of the retainer ring 14 is positioned.

Figure 6:
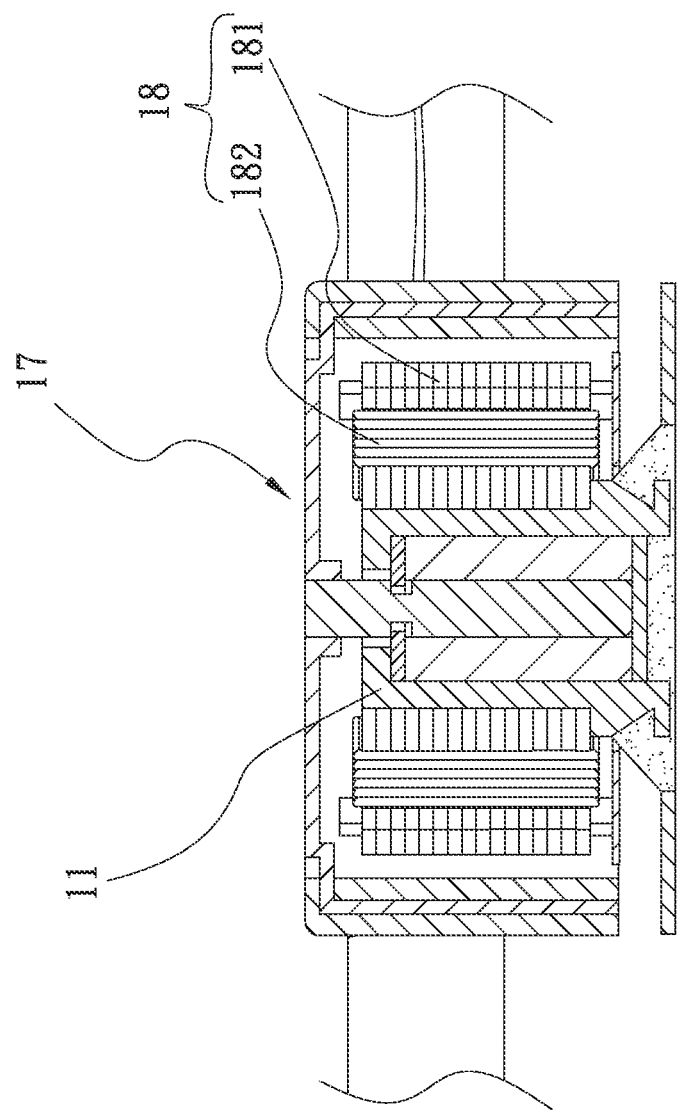
FIG. 6 is a sectional assembled view of a fourth embodiment of the fan bearing cup connection structure of the present invention.

Please now refer to FIG. 6, which is a sectional assembled view of a fourth embodiment of the fan bearing cup connection structure of the present invention. The fourth embodiment is partially identical to the third embodiment in technical characteristic and thus will not be repeatedly described hereinafter. The fourth embodiment is different from the third embodiment in that the fourth embodiment further has a stator assembly 18. The stator assembly 18 has multiple silicon steel sheets 181, which are stacked and overlapped with each other. Multiple windings 182 are wound around the silicon steel sheets 181. The stator assembly 18 is fitted around the bearing cup 11 corresponding to the rotor assembly 17.

The present invention provides a fan bearing cup connection structure to eliminate the shortcomings of the conventional cooling fan due to that both the bearing cup and the fan base seat are made of metal material and riveted with each other. In the present invention, the connection member is a structure body made by injection molding. The material of the connection member can be freely selected from a group consisting of shock absorption material and elastic material. In this case, the bearing cup and the bottom board can be tightly connected and the concentricity of the bearing cup and the bottom board can be enhanced to further eliminate the problem of vibration of the bearing cup and the bottom board and the problem of noise.

The present invention has been described with the above embodiments thereof and it is understood that many changes and modifications in the above embodiments can be carried out without departing from the scope and the spirit of the invention that is intended to be limited only by the appended claims.

What is claimed is:

1. A fan bearing cup connection structure comprising a bearing cup, a bottom board and a connection member, the bearing cup having a receiving space, a connected section and a shaft hole, the shaft hole being formed at a top end of the bearing cup in communication with the receiving space, the connected section being disposed on outer circumference of the other end of the bearing cup opposite to the shaft hole, the bottom board having an opening, the connected section of the bearing cup being disposed in the opening of the bottom board, the connection member being disposed between the opening of the bottom board and the connected section of the bearing cup by means of injection molding to connect the bottom board and the bearing cup, whereby the bearing cup and the bottom board are tightly connected to further eliminate the problem of vibration of the bearing cup and the bottom board and the problem of noise;

wherein the connected section of the bearing cup has a groove, a first annular body and a second annular body, the first and second annular bodies being annularly disposed on outer circumference of the bearing cup to together define the groove, the first annular body having a beveled portion inclined toward the groove.

2. The fan bearing cup connection structure as claimed in claim 1, wherein a retainer ring, a bearing and a wear plate are further disposed in the receiving space of the bearing cup and arranged in the receiving space in sequence from upper side to lower side, the retainer ring having a perforation, the bearing having an axial passage, the perforation and the axial passage communicating with the shaft hole.

3. The fan bearing cup connection structure as claimed in claim 1, wherein the other end of the bearing cup is an open end opposite to the shaft hole, the connection member serving to block the open end.

4. The fan bearing cup connection structure as claimed in claim 2, further comprising a rotor assembly, the rotor assembly having a shaft and a fan impeller, the shaft having a first end and a second end, the shaft being formed with a groove in adjacency to the first end, the fan impeller being connected with the first end of the shaft, the second end of the shaft passing through the perforation, the axial passage and the shaft hole and being rotatably connected with the bearing, the second end abutting against the wear plate.

* * * * *